A. CRUZAN.
VEHICLE TIRE.
APPLICATION FILED JULY 5, 1916.
1,298,915.
Patented Apr. 1, 1919.
Fig. I.
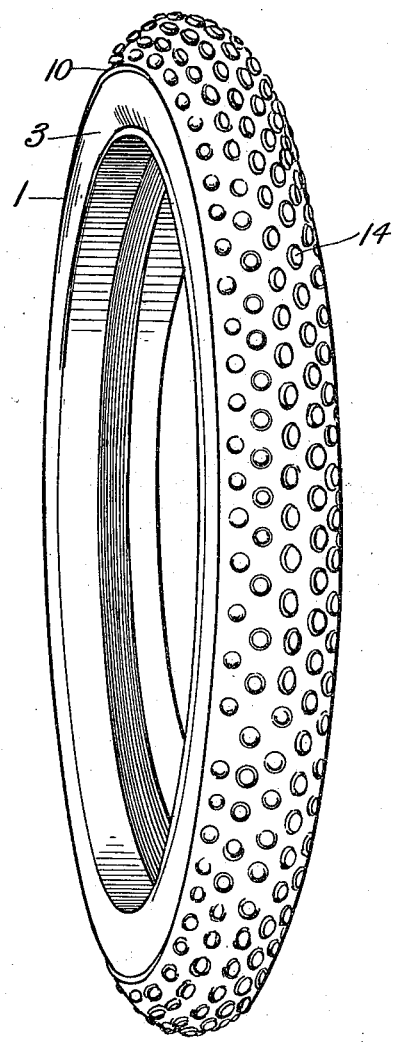
Fig. II.
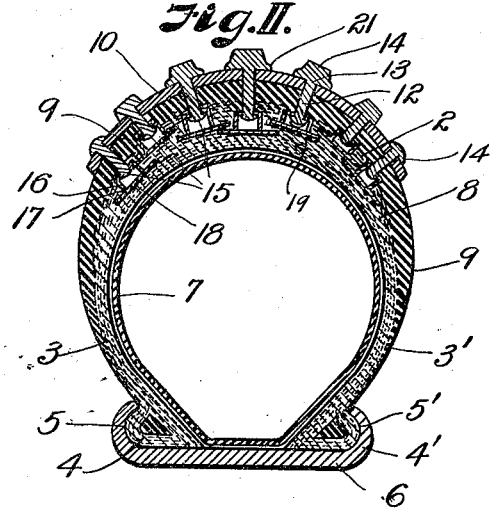
Fig. III.
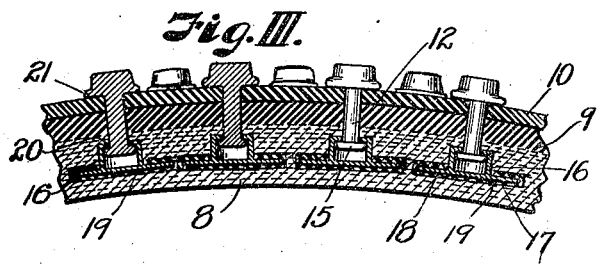
Fig. IV.
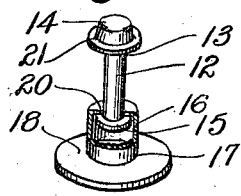
INVENTOR.
Albert Cruzan
BY Arthur C. Brown
ATTORNEY

UNITED STATES PATENT OFFICE.

ALBERT CRUZAN, OF LAWRENCE, KANSAS.

VEHICLE-TIRE.

1,298,915.  Specification of Letters Patent.  Patented Apr. 1, 1919.

Application filed July 5, 1916. Serial No. 107,527.

*To all whom it may concern:*

Be it known that I, ALBERT CRUZAN, a citizen of the United States, residing at Lawrence, in the county of Douglas and State of Kansas, have invented certain new and useful Improvements in Vehicle-Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to vehicle tires and more particularly to an outer casing for pneumatic tires, such as are ordinarily used on the wheels of motor driven vehicles, the object of the invention being to provide a non-skid and puncture proof tire casing and also to provide means for increasing the life and durability thereof.

In accomplishing this object I have provided improved details of structure the preferred form of which is hereinafter described and illustrated in the accompanying drawings, wherein:—

Figure I is a perspective view of a tire casing embodying my invention.

Fig. II is a cross-sectional view of the same.

Fig. III is a longitudinal section of a portion of the tread.

Fig. IV is a detail perspective view of one of the tire studs and its anchoring plate.

Referring more in detail to the drawings:—

1 designates a tire casing constructed according to my invention, which comprises the main body portion 2, and the side members 3—3' which are provided with edge gripping beads 4—4' adapted for seating within the inwardly opening sockets 5—5' of a wheel rim 6 and which inclose an inner tube 7.

The casing is similar in construction to those in ordinary use in that it preferably comprises an inner body portion of fabric 8 which may be either of single thread formation or of built up layers and which is bound together by a vulcanizing substance and provided with an outer covering 9 of rubber or the like, and having an overlaid tread portion 10, of a tougher material, such as leather, which is more durable than the rubber and is better adapted for retaining the non-skid and tire protecting members presently described.

Closely spaced and projecting through the tread portion 10 and extending into the body 2, are the shanks 12 of studs 13, having heads 14 which project outwardly from the tread and provide traction for the tire and also serve to protect the tread from wearing away.

The shanks 12 of the studs are provided with heads 15 at their inner ends which are slidably retained within chambered bosses 16 of anchor members 17. The anchor members comprise circular disks or plates 18, which are embedded between layers of the casing fabric as the casing is formed and each plate is provided with an individual vulcanized pad 19. The bosses 16 formed on the said plates are extended outwardly from the plates and provided with apertured end portions 20 through which the shanks 12 are slidably extended and which serve to anchor the shank heads 15 within the chambered bosses, the bosses being of sufficient length to allow the heads and shanks to move therein when the casing tread is compressed under varying loads.

In order to protect the inner tube from punctures, the anchor members 17 are overlapped, so that anything penetrating the casing will contact one of the said disks; the latter however spaced sufficiently to avoid interference with the resiliency of the casing.

I also prefer to provide the studs at the center of the casing, which receive the greatest wear and on which the greatest weight is placed, with extended flanges 21, which provide greater bearing surface for the stud heads against the tread and prevent their being pressed therein.

With a tire casing so constructed and with the studs anchored therein as described, it is apparent that the extended heads will prevent slipping and will provide traction for, and prevent wearing of the tire.

It is also apparent that the anchor plates when spaced sufficiently close will effectively prevent anything puncturing the casing and that the slip connection between the anchor members and studs will permit compression of the casing without loosening the anchors or causing a breaking or tearing of the fabric.

It is also apparent that the leather tread will increase the durability of the tire and provide a more substantial bearing surface for the stud heads and that by providing studs of a hard metal, such as chilled steel, they will wear for an indefinite period of time and afford a serviceable and durable casing.

Having thus described my invention what I claim as new therein and desire to secure by Letters-Patent, is:—

1. In a tire, a flexible casing adapted to embrace an inner inflatable tube, anchor members embedded in and supported entirely by said casing, each anchor member having an outwardly extending hollow cylindrical neck having a rigid inner end and having at its outer end an inwardly extending peripheral lip, and studs having shanks extending into and slidable in said casing and provided each at its outer end with a head resting against the outer side of the casing, and having each at its inner end a head, the heads at the inner ends of said shanks being respectively slidable in said necks and normally spaced apart from the closed inner ends of said necks and limited in their outward movement by said lips, and limited on their inward movement by the closed ends of said necks.

2. In a tire, a flexible casing comprising layers of fabric, a tread portion, and a resilient layer intermediate of the fabric and the tread portion, anchor members embedded in and supported wholly by said fabric, each anchor member having an outwardly extending cylindrical hollow neck having a rigid inner end and having at its outer end an inwardly extending peripheral lip, and studs having heads resting against the outer side of said tread portion and having each a shank which extends through the tread portion and the intermediate layer, said shanks each having at its inner end a head, the last named heads being respectively slidable in said necks and normally spaced apart from the closed inner ends of said necks and having their outward movement limited by said lips, and limited on their inward movement by the closed ends of said necks.

In testimony whereof I affix my signature.

ALBERT CRUZAN.

Copies of this patent may be obtained for five cents each, by addressing the "Commissioner of Patents, Washington, D. C."